United States Patent [19]

Kisoda et al.

[11] Patent Number: 4,808,437

[45] Date of Patent: Feb. 28, 1989

[54] METHOD FOR PRODUCING MAGNETIC RECORDING MEDIUM

[75] Inventors: Akira Kisoda, Moriguchi; Hiroshi Suzuki, Kadoma; Tomiharu Hosaka; Masanaru Hasegawa, both of Yawata, all of Japan

[73] Assignee: Matsushita Electric Industrial Co., Ltd., Osaka, Japan

[21] Appl. No.: 141,262

[22] Filed: Jan. 6, 1988

[30] Foreign Application Priority Data

Jan. 7, 1987 [JP] Japan ................................. 62-1244

[51] Int. Cl.4 ......................... H01F 10/02; B05D 5/12
[52] U.S. Cl. ....................................... 427/130; 427/128
[58] Field of Search ................................. 427/130, 128

[56] References Cited

U.S. PATENT DOCUMENTS 4,254,585 3/1981 Schoettle et al. ............... 427/130 X
4,539,220 9/1985 Martinelli ....................... 427/130 X Primary Examiner—Bernard Pianalto
Attorney, Agent, or Firm—Wenderoth, Lind & Ponack

[57] ABSTRACT

By polishing a surface of a magnetic layer of magnetic recording medium in a direction which coincides with a track angle defined during the recording and reproducing thereof, drop out is decreased and electromagnetic characteristics are improved.

2 Claims, 1 Drawing Sheet

METHOD FOR PRODUCING MAGNETIC RECORDING MEDIUM

BACKGROUND OF THE INVENTION

1. Field of the Invention

The present invention relates to a method for producing a magnetic recording medium such as a digital audio tape (DAT), a digital video tape (DVT), a ½ inch video tape, an 8 mm video tape and the like. More particularly, it relates to a method for producing a magnetic recording medium having decreased drop out and increased electromagnetic characteristics.

2. Description of the Prior Art

Magnetic recording medium is increasingly required to have high density recording characteristics. To satisfy such a requirement, it is important to decrease loss during recording and reproducing in a short wavelength range. However, when recording and reproducing in the short wavelength range, drop out is caused by minute protrusions on a magnetic layer of the magnetic recording medium and debris, which is powder drop from a surface of the magnetic recording medium even when the size of protrusions or the amount of debris is so small as to not cause serious drop out in the conventional recording wavelength range.

Hitherto, to prevent the drop out, it has been proposed to increase the dispensability of magnetic paint by improving the dispersing conditions under which the paint is applied or the apparatus for applying the magnetic paint, or by modifying the magnetic paint composition, or by improving calendering conditions after the magnetic paint is disposed on a substrate. However, the drop out in the short wavelength range cannot be prevented by such conventional techniques.

In the production of a floppy disc, it is known from U.S. Pat. No. 4,499,122, to polish a surface of the magnetic layer thereof, and recently incorporating a polishing step in a method for producing magnetic recording tape has been investigated.

Since the magnetic tape medium is required to have increased high density recording characteristics, the medium including 8 mm video tape, DAT and DVT, a minute degree of debris causes great drop out. To prevent such powder drop, the surface of the magnetic layer of the medium is polished. Although the polishing can decrease debris, to achieve a satisfactory decrease of drop out, polishing conditions should be intensified or the number of polishing steps should be increased. However, the intensification of polishing or an increase in the number of times the medium is polished will damage the surface of magnetic layer and in turn induce deterioration of electromagnetic characteristics of the magnetic recording medium. In an extreme case, the drop out increases.

SUMMARY OF THE INVENTION

One object of the present invention is to provide a method fo producing a magnetic recording medium having less drop out.

Another object of the present invention is to provide a simple method for producing a magnetic recording medium, by which method drop out is decreased without decreasing electromagnetic characteristics of the medium.

These and other objects are accomplished by a method for producing a magnetic recording medium according to the present invention which comprises polishing a surface of the magnetic layer of the medium in a direction which coincides with a track angle of the magnetic recording medium defined during recording and reproducing thereof.

As a result of extensive studies aimed at finding a polishing method by which drop out is decreased without deteriorating electromagnetic characteristics, a comparatively simple polishing method which can provide a reproducible result has been found.

Since according to the conventional method, the surface of a magnetic layer is polished in a longitudinal direction, surface roughness along the polishing direction differs from that transverse to the polishing direction so that the surface roughness along the polishing direction, namely the longitudinal direction, is even more decreased. According to the present invention, by recognizing the fact that the surface roughness along the polishing direction is improved, the surface of magnetic layer of the magnetic recording medium is polished in a direction which coincides with a video track angle.

According to the polishing method of the present invention, the drop out is effectively decreased even after polishing under moderate conditions is performed. If scratches are formed by polishing under comparatively severe conditions, the electromagnetic characteristics of the magnetic recording medium are not adversely affected and no drop out is caused since the direction of scratches coincides with a scanning direction of a magnetic head.

DETAILED DESCRIPTION OF THE PREFERRED EMBODIMENTS

Figure 1:
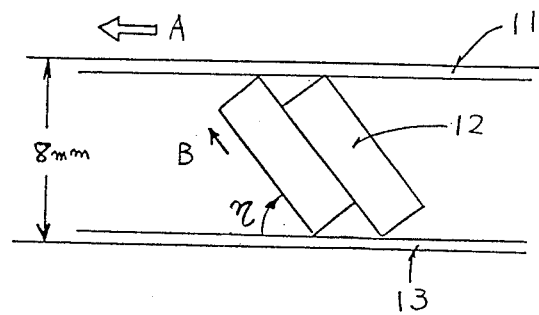
FIG. 1 schematically shows a tape format of an 8 mm video tape.

In the present invention, any conventional ferromagnetic powder can be used. Examples of the ferromagnetic powder are metal oxide magnetic powder (e.g. $\gamma$-Fe$_2$O$_3$, cobalt-containing $\gamma$-Fe$_2$O$_3$, cobalt-coated $\gamma$-Fe$_2$O$_3$, etc.), metal magnetic powder (e.g. iron, nickel, cobalt, etc.) and ferrite (e.g. barium ferrite, etc.).

A binder resin contained in the magnetic paint can include any of the conventional resins such as thermoplastic resins, thermosetting resins and electron radiation curing resins as well as mixtures thereof.

Preferably, the thermoplastic binder resin has a softening temperature of not higher than 150° C., an average molecular weight of 4,000 to 20,000, and a polymerization degree of about 200 to about 2,000. Specific examples of the thermoplastic resin are vinyl chloride-vinyl acetate copolymer, vinyl chloride-vinylidene chloride copolymer, acrylate-acrylonitrile copolymer, acrylate-vinylidene chloride copolymer, acrylate-styrene copolymer, methacrylate-acrylonitrile copolymer, methacrylate-vinylidene chloride copolymer, methacrylate-styrene copolymer, urethane elastomer, polyvinyl fluoride, vinylidene chloride-acrylonitrile copolymer, acrylonitrile-butadiene copolymer, polyamide resin, polyvinyl butyral, styrene-butadiene copolymer, polyester resin, chlorovinyl ether-acrylate copolymer, amino resin, and cellulose derivatives (e.g. cellulose acetate butyrate, cellulose diacetate, cellulose triacetate, cellulose propionate, nitrocellulose, etc.).

Preferably, the thermosetting resin has a molecular weight of not larger than 500,000 in the magnetic paint and, after the application thereof, becomes insoluble in a solvent due to condensation or addition reaction. Among them, preferred thermosetting resins are those which do not soften or melt before thermal decomposition. Specific examples of the thermoplastic resins are phenol resin, epoxy resin, polyurethane resin, urea resin, melamine resin, alkid resin, silicone resin, acrylic resin, vinyl chloride-vinyl acetate resin, a mixture of methacrylate salt copolymer and diisocyanate prepolymer, a mixture of high molecular weight polyester resin and diisocyanate prepolymer, urea-formaldehyde resin, a mixture polyesterpolyol and (poly)isocyanate, polyamide resin, a mixture of low molecular weight glycol, high molecular weight diol and triphenylmethane triisocyanate, as well as mixtures thereof.

Examples of the electron radiation curing resin, are unsaturated prepolymers (e.g. a maleic anhydride type, urethane-acrylic type, polyester-acrylic type, polyether-acrylic type, polyurethane-acrylic type and polyamide-acrylic type) and polyfunctional monomers (e.g. an ether-acrylic type, urethane-acrylic type, phosphate-acrylic type and aryl type).

To increase the durability of the magnetic recording medium according to the present invention, the magnetic layer may be provided with any hardener such as aromatic or aliphatic isocyanate. Examples of the aromatic isocyanate are tolylenediisocyanate (TDI), 4,4-diphenylmethanediisocyanate (MDI), xylylenediisocyanate (XDI), metaxylenediisocyanate (MXDI), and addition products of these isocyanates with an active hydrogen-containing compound (e.g. polyol adipate). Examples of the aliphatic isocyanate are hexamethylenediisocyanate (HMDI), lysinediisocyanate, trimethylhexamethylenediisocyanate, and addition products of these isocyanates with an active hydrogen-containing compound. Of the aliphatic isocyanate hardeners, acyclic isocyanate and an addition product of the acyclic isocyanate and the active hydrogen-containing compound are preferred. The most preferred hardeners comprising the addition product of the isocyanate and the active hydrogen-containing compound, are those having an average molecular weight of 100 to 3,000.

To assist the dispersion of the magnetic powder in the binder resin, the magnetic paint contains a dispersing agent. Examples of the dispersing agent are lecithin, an aliphatic acid having 8 to 18 carbon atoms (e.g. capric acid, lauric acid, myristic acid, palmitic acid, stearic acid, oleic acid, elaidic acid, linoleic acid, linolenic acid, etc.), and a metal soap comprising an alkali metal salt or an alkaline earth metal salt comprising the above-mentioned fatty acids (e.g. lithium, sodium and potassium salts and magnesium, calcium and barium salts). In addition, higher alcohol compounds having at least 12 carbon atoms or sulfate may be used as the dispersing agent.

To improve the electromagnetic characteristics of the magnetic recording medium, an abrasive material is preferably used. Examples of the abrasive material are fused alumina, silicon carbide, chromium oxide, corundum, synthetic corundum, diamond, artifical diamond, garnet, emery (comprising corundum and magnetic iron ore, etc.).

Optionally, the magnetic layer contains an antistatic agent. Examples of the antistatic agent are a powdery electrically conductive agent (e.g. graphite, carbon black, tin oxide-antimony oxide base compound, titanium oxide-tin oxide-antimony oxide base compound, etc.). Also, the magnetic layer may optionally contain a surfactant such as a naturally occurring surfactant (e.g. saponin), a nonionic surfactant (e.g. an alkylene oxide base surfactant, glycerin base surfactant, glycide base surfactant, etc.), a cationic surfactant (e.g. higher alkyl amines, quaternary ammonium salts, heterocyclic compounds such as pyridine, phosphonium, sulfonium, etc.), an anionic surfactant having an acidic group such as a carboxylic acid group, sulfonic acid group, phosphoric acid group, sulfate group, phosphate group and the like, and an amphoteric surfactant (e.g. amino acid, aminosulfonic acid, sulfate and phosphate of aminoalcohol, etc).

Further, the magnetic layer may optionally contain a lubricant. Examples of the lubricant are silicone oil, graphite, molybdenum disulfide, tungsten disulfide, a monobasic fatty acid having 12 to 16 carbon atoms, and an ester of fatty acid having 21 to 23 carbon atoms with a monohydric alcohol.

For the preparation of the magnetic paint, any conventional mixing apparatus may be used. For example, a three-roll mill, agitator mill, ball mill, pebble mill, sand grinder, high speed stone mill, high speed impact mill, dispenser, attritional kneader, planetary mixer, high speed mixer, homogenizer, cobalt mill, ultrasonic disperser, or a combination thereof may be used.

In the method of the present invention, all the steps except the polishing step may be performed by conventional methods for producing a magnetic recording medium.

The present invention will be illustrated by the following Examples, in which "parts" are by weight unless otherwise indicated.

EXAMPLE 1

An 8 mm video tape was produced.

The following components were mixed by a continuous kneader, a ball mill and a sand mill:

| Components | Parts |
| --- | --- |
| Fe—Co—Ni metal magnetic powder (BET specific surface area: 55 m$^2$/g, Hc: 1,500 Oe, $\sigma_s$: 125 emu/g, major axis: 0.23 μm, minor axis: 0.04 μm) | 100 |
| Polyurethane | 10 |
| Vinyl chloride-vinyl acetate copolymer | 10 |
| $\alpha$-Al$_2$O$_3$ | 5 |
| Myristic acid | 2 |
| Pentyl stearate | 1 |
| Methyl ethyl ketone/toluene/methyl isobutyl ketone (weight ratio, 2:2:1) | 200 |

To the mixture, four parts polyisocyanate (Colonate L manufactured by Nippon Polyurethane) was added and filtered through a filter having an average pore size of 1 μm to prepare a magnetic paint. Then, the paint was applied to on one surface of a polyethyleneterephthalate base film having a thickness of 10 μm, orientated, dried and calendered followed by curing to form a magnetic layer. On the other surface of the film, a back coat layer comprising carbon black was formed.

Before cutting the film, the surface of the magnetic layer was polished.

An 8 mm video deck has a video track angle $\eta$ of 4° 54′ 13.2″ as shown in FIG. 1, in which the arrow A indicates a traveling direction of the tape, the arrow B indicates a rotational direction of a magnetic head, numeral 11 indicates an auxiliary track for queue signals, 12 indicates a track for video signals and FM audio signals, and 13 indicates an audio auxiliary track. Thus, the polishing was carried out in a direction which coincides with the track angle $\eta$.

Figure 2:
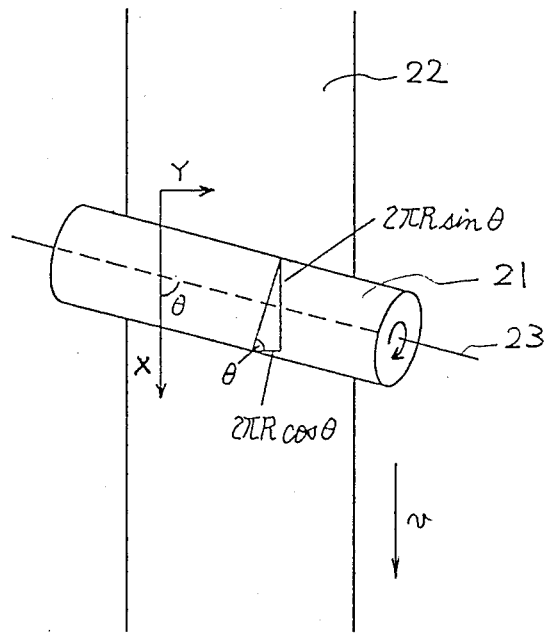
FIG. 2 is a conceptual view of the relationship between a magnetic tape and polishing means for illustrating the polishing method according to the present invention.

In this Example, as shown in FIG. 2, a cylindrical abrasive 21 having a radius R is used as a polishing means and rotated at T rpm. The video tape 22 is fed at a rate of v m/min. The video tape runs at an angle $\theta$ to the axis 23 of the cylindrical abrasive 21. X and Y indicate a tape feeding direction and a direction extending width-wise of the tape, respectively.

A relative velocity in the direction X is expressed by $(v - 2\pi RT \sin \theta)$ m/min., and a relative velocity in the direction Y is expressed by $(2\pi RT \cos \theta)$ m/min. According to the present invention, the ratio of these velocities is matched with the tangent of the track angle $\eta$ as follows:

$$\tan \eta = 2\pi RT \cos \theta / (v - 2\pi RT \sin \theta).$$

From the equation above, the rotating speed T of the cylindrical abrasive is calculated.

When the tape feeding rate v is 200 m/min., the radius R of the abrasive 23 is 5 cm, and the angle $\theta$ is set at 80 degrees, the rotating speed T is calculated to be 211 rpm since the track angle $\eta$ is 4° 54′ 13.2″. Therefore, in this Example, the polishing was carried out at a rotating speed of 211 rpm.

COMPARATIVE EXAMPLE 1

Polishing was performed in the same manner as in the Example described above except that the axis of the cylindrical abrasive was oriented in the direction Y (namely $\theta = 90°$).

COMPARATIVE EXAMPLE 2

Polishing was performed in the same manner as in Comparative Example 1 but repeated three times.

COMPARATIVE EXAMPLE 3

In this Comparative Example, the surface of the magnetic layer was not polished.

The properties of the thus obtained magnetic tapes are shown in following Table.

Surface roughness is expressed in tems of "Ra" which is an arithmetical mean of deviations from the center line of the surface roughness measured by "Talystep" (manufactured by Rank Talor Hobson).

Each magnetic tape having the magnetic layer and the back coat layer was cut to a width of 8 mm and set in a cassette. Then, the video tape cassette was installed in an 8 mm video deck (MVS 5000 sold by Eastman Kodak. The drop out was counted at 15 $\mu$sec, −16 dB or 3 $\mu$sec, −10 dB by a drop out counter (VHOIBZ manufactured by Shibasoku).

By modifying the above-mentioned video deck, C/N was measured by using a carrier wave having a frequency of 5 MHz and a wave having a frequency 4.5 MHz as noise. C/N is expresed by using the C/N of the unpolished tape as a standard.

TABLE

| Example No. | 1 | Com. 1 | Com. 2 | Com. 3 |
|---|---|---|---|---|
| $R_a$ (MD*1) ($\mu$m) | 0.015 | 0.014 | 0.013 | 0.017 |
| Ra (TD*2) ($\mu$m) | 0.018 | 0.017 | 0.019 | 0.019 |

TABLE-continued

| Example No. | 1 | Com. 1 | Com. 2 | Com. 3 |
|---|---|---|---|---|
| Ra in video track direction | 0.014 | 0.015 | 0.015 | 0.017 |
| Ra in perpendicular to video track direction | 0.018 | 0.018 | 0.020 | 0.019 |
| Drop out (15 $\mu$sec, −16 dB) (number/min.) | 8 | 20 | 12 | 138 |
| Drop out (3 $\mu$sec, −10 dB) (number/min.) | 67 | 213 | 269 | 1427 |
| C/N (dB) | +1.5 | +1.0 | +0.5 | 0 |
| Scratches of the tape | No | No | Yes | Yes |

Note:
*1MD = Machine direction (longitudinal direction).
*2TD = Transverse direction (lateral direction).

As can be seen from a comparison of the results of Example 1 with those of Comparative Examples, the polishing method of the present invention can effectively decrease the number of drop outs, namely increase the electromagnetic characteristics. As can also be seen from a comparison of the results of Example 1 with those of Comparative Examples 1 and 2, polishing in the direction of the tack of video tape can impart better overall properties to the video tape than can polishing in the longitudinal direction thereof.

Although in Examples above, 8 mm video tape was used, the polishing direction can be analogously determined for other magnetic recording tape. In a standard ½ inch VHS video tape, the track angle is 5° 58′ 9.9″ and in a standard DAT, the track angle is 6° 22′ 59.5″.

Although the polishing was carried out before cutting the film in the Examples above, it is possible to polish the tape after cutting the film, whereby burrs made by cutting are preferably removed. The film or tape can be repeatedly polished according to the present invention. For example, the film may be polished just after cutting and before it is wound in the cassette.

Furthermore, instead of the cylindrical abrasive, an abrasive tape may be used.

What is claimed is:

1. A method of producing a magnetic recording medium, said method comprising the steps of:
   providing a recording medium comprising a substrate, a magnetic layer comprising magnetic powder disposed on at least one surface of the substrate, and a track comprising recorded signals that are defined on said at least one surface thereof and are also reproduceable therefrom in a tracking direction that extends obliquely to a feeding direction of the recording medium, an oblique tracking angle being defined between said tracking direction and longitudinal feeding direction;
   feeding the recording medium at a feeding velocity in said feeding direction; and
   polishing said magnetic layer by running abrasive thereover in an abrading direction and at a predetermined abrading speed, an abrading angle being defined between the abrading direction and a direction extending perpendicular to said feeding direction, and
   said tracking angle, said abrading speed, said abrading angle and said feeding speed satisfying the equation $$\tan \eta = P \cos \theta / v \, P \sin \theta$$

wherein $\eta$ represents said tracking angle in degrees, P represents said abrading speed in m/sec, $\theta$ represents said abrading angle in degrees, and v represents said feeding speed in m/sec.

2. A method as claimed in claim 1, wherein said step of polishing said magnetic layer by running abrasive thereover comprises polishing said magnetic layer by disposing a cylindrical mass of abrasive having a rotational axis and a predetermined radius over the magnetic layer with said axis extending in said direction extending perpendicular to said feeding direction, and rotating said cylindrical mass of abrasive about said axis thereof at a rotational speed, and satisfying the equation $$P = 2\pi RT$$

wherein R represents the radius of said cylindrical mass of abrasive in meters, and T represents said rotational speed in rpm.

* * * * *